Patented Nov. 20, 1923.

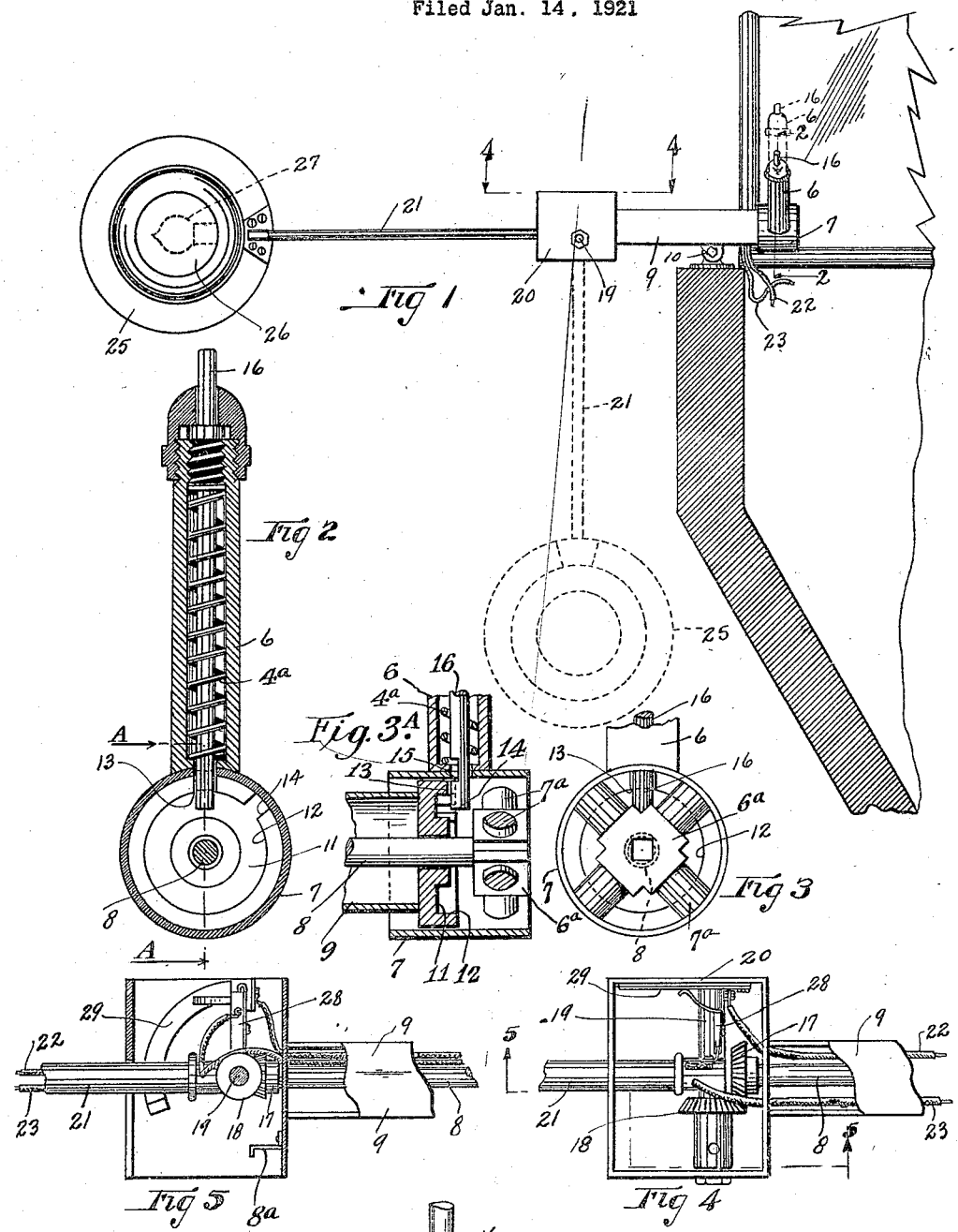

1,475,035

UNITED STATES PATENT OFFICE.

HENRY SNYDER, OF CHICAGO, ILLINOIS.

SIGNALING DEVICE.

Application filed January 14, 1921. Serial No. 437,206.

*To all whom it may concern:*

Be it known that I, HENRY SNYDER, a citizen of the United States, and a resident of the city of Chicago, county of Cook, and State of Illinois, have invented certain new and useful Improvements in Signaling Devices, of which the following is a specification.

My invention relates to a signaling device adapted to be used in connection with motor vehicles and has for its principal object the provision of a new and improved construction which will be highly efficient in use.

Another object of my invention is the provision of a signaling device adapted to be controlled by the occupant of a vehicle whereby the said occupant can indicate that the vehicle is about to turn or stop, as the situation may be.

Other objects will appear hereinafter.

The invention consists in the combinations and arrangements of parts hereinafter described and claimed.

The invention will be best understood by reference to the accompanying drawings forming a part of this specification, in which, Fig. 1 is a cross-sectional view of a portion of a vehicle showing my improved signaling device mounted thereon;

Fig. 2 is an enlarged sectional detail taken substantially on line 2—2 of Fig. 1;

Fig. 2ᵃ' is a fragmentary detail of the plunger embodied in my improved signaling device;

Fig. 3 is a fragmentary end view of my improved signaling device;

Fig. 3ᴬ is a fragmentary sectional detail view taken substantially on line A—A of Fig. 1;

Fig. 4 is a fragmentary plan view taken substantially on line 4—4 of Fig. 1; and Fig. 5 is a cross-sectional view taken substantially on line 5—5 of Fig. 4.

The preferred form of construction comprises an arm 6 integrally mounted on a cylindrical casing 7 secured to the inner end of a rocker shaft 8 which is carried by a bearing casing 9 adjustably mounted on a bracket 10. The end of the shaft 8 being square in cross section passes through an opening of similar shape formed in a bearing member 6ᵃ which is supported centrally within the cylinder 7 by radially extending supports 7ᵃ, fixedly secured to said cylinder as shown in Fig. 3. The bracket 10 is secured to one of the doors of an automobile or within reaching distance from the driver's seat. Integrally mounted on one end of the bearing casing 9 is a ratchet plate 11 having a peripheral flange 12 provided with notches 13 and 14. Said flange 12 is adapted to engage with a notch 15 provided on the lower end of a spring held plunger 16 carried by the arm 6. Secured to the outer end of the rocker shaft 8 is a bevelled gear 17 adapted to engage with the bevelled gear 18 mounted on a shaft 19. Said shaft 19 is carried by a housing 20 which is integrally formed on the outer end of the bearing casing 9. A signal arm 21, which is tubular to serve as a conduit for electric wires 22 and 23, is carried on the shaft 19. Rigidly mounted on the outer end of the signal arm 21 is a signal head 25 the front and rear sides of which are provided with transparent or colored glass 26 forming a housing for an electric light 27.

As is clearly shown in Fig. 5 of the drawings, the shaft 19 carries a relatively movable switch member 28 adapted to contact, under certain conditions, with a relatively fixed switch member 29 carried by the housing 20.

In operation, when it is desired to indicate a stop or turn of the vehicle, upon a depression of the plunger 16, the lower end of the said plunger is thrown out of engagement with the notch 13 and the notch 15 is brought into operative engagement with the flange 12. Then, by a movement of the arm 6, the rocker shaft is caused to rock and the bevelled gear 17 makes an operative engagement with the bevelled gear 18, bringing the signal arm to a horizontal position, and at the same time, the movable switch member 28 is brought into contact with the fixed switch member 29, thereby providing the desired illumination. Upon completion of an operative stroke of the handle 6 the notch 15 is brought into registration with the notch 14 and upon release of the pressure applied to the plunger 16 the said plunger is forced upwardly through the medium of an extension spring 4ᵃ bringing the lower end of the plunger 16 into engagement with the notch 14. This operation of a plunger 16 locks the signal arm 21 in a horizontal position until the plunger is again depressed at which time the arm drops back into its initial position. When the signal arm is lowered into its initial position it is arrested by a stop member 8ª which prevents the head of the signal arm from striking against the side of a car upon which the same is mounted.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:

1. A signal operating device including a shaft adapted to oscillate through a vertical plane, means for operating said shaft, said means including a shaft operatively connected to the oscillatory shaft and an operating handle carried by the second named shaft, and means for locking the oscillatory shaft with its length extending in a horizontal plane, said means includes a ratch member, having a peripheral flange with notches formed therein and a plunger for engagement with the notches and having a notch formed in its end for the reception of the peripheral flange.

2. A signal operating device comprising a bearing member; a shaft journaled through said bearing member; a housing carried by said bearing member at one end thereof; a transverse shaft arranged in said housing and operatively connected to said first mentioned shaft, an arm operatively connected with said transverse shaft; an operating handle carried by said first named shaft; a flange member carried by said bearing member, there being notches formed in the flange of said member; and a spring held plunger arranged within said handle and adapted to engage said notches for locking said shafts against rotation.

3. In a signal operating device comprising shaft portions operatively connected together; means for operating said shafts; and means for locking said shafts against operation. said means comprising a member having a peripheral flange and notches formed in the flange thereof, and a spring controlled plunger having a notch for the reception of said flange and adapted to engage the notches thereof.

4. A device of the class described including an operating handle, a shaft operated by said handle, a member on said shaft having a peripheral flange and notches formed in the flange thereof, a spring-controlled plunger for engagement with the notches of said flange, said plunger being provided with a notch at one end for the reception of the flange of said member, and a shaft portion operatively connected to said first named shaft.

In testimony whereof I have signed my name to this specification in the presence of two subscribing witnesses.

HENRY SNYDER.

Witnesses:
 CLARENCE E. THREEDY,
 JOSHUA R. H. POTTS.